United States Patent
Svitak

(10) Patent No.: US 11,518,279 B2
(45) Date of Patent: Dec. 6, 2022

(54) SMART AUTOMATIC SEAT HEIGHT ADJUSTMENT SYSTEM

(71) Applicant: Sears Manufacturing Co., Davenport, IA (US)

(72) Inventor: Tylor Svitak, East Moline, IL (US)

(73) Assignee: Sears Manufacturing Co., Davenport, IA (US)

( * ) Notice: Subject to any disclaimer, the term of this patent is extended or adjusted under 35 U.S.C. 154(b) by 585 days.

(21) Appl. No.: 16/667,796

(22) Filed: Oct. 29, 2019

(65) Prior Publication Data

US 2020/0156518 A1    May 21, 2020

Related U.S. Application Data

(60) Provisional application No. 62/751,855, filed on Oct. 29, 2018.

(51) Int. Cl.
  *B60N 2/50* (2006.01)
  *B60N 2/02* (2006.01)
  *B60R 16/037* (2006.01)

(52) U.S. Cl.
  CPC ........... *B60N 2/501* (2013.01); *B60N 2/0244* (2013.01); *B60N 2/502* (2013.01); *B60N 2/505* (2013.01); *B60R 16/037* (2013.01)

(58) Field of Classification Search
  CPC ...... B60N 2/501; B60N 2/0244; B60N 2/502; B60N 2/505; B60N 2/002; B60R 16/037
  See application file for complete search history.

(56) References Cited

U.S. PATENT DOCUMENTS

| | | | | |
|---|---|---|---|---|
| 6,833,516 B2* | 12/2004 | Breed | ............... | B60R 21/01536 177/144 |
| 7,762,582 B2* | 7/2010 | Breed | .................. | B60N 2/0232 180/274 |
| 2003/0116362 A1* | 6/2003 | Breed | .................... | B60N 2/853 177/144 |
| 2007/0034768 A1* | 2/2007 | Stenard | .................. | B60N 2/505 248/562 |
| 2017/0282821 A1* | 10/2017 | Zych | ...................... | G06Q 50/30 |
| 2019/0149611 A1* | 5/2019 | Mueller | ................ | B60N 2/002 455/456.1 |
| 2019/0149612 A1* | 5/2019 | Mueller | ................ | H01Q 13/20 455/456.1 |

* cited by examiner

Primary Examiner — Richard M Camby
(74) Attorney, Agent, or Firm — Lane & Waterman LLP

(57) ABSTRACT

The present disclosure is directed to an automatic seat height system that adjusts a seat height. The height of a seat is adjusted only when a calculated seat height is outside of the range of a desired seat height. The seat is adjusted only when a seat height change from the desired seat height is not due to external forces such as vibration or shock. The seat height apparatus comprises a sensor, a height adjustment apparatus, a controller and a controllable actuator all in operable communication. The controller comprises software that calculates a calculated seat height based on a measured raw seat height. The calculated seat height is a time history position value pattern. The controller then compares the calculated seat height to a desired seat height to determine a change factor. If the change factor is outside of a predetermined range, the controller directs the controllable actuator to change the height of the seat to bring it within the range.

8 Claims, 4 Drawing Sheets

SMART AUTOMATIC SEAT HEIGHT ADJUSTMENT SYSTEM

PRIORITY

This application claims priority to U.S. provisional patent application Ser. No. 62/751,855, filed Oct. 29, 2018, which is incorporated herein by reference.

BACKGROUND

This disclosure relates generally to seat support and suspension systems, and more particularly to a system and method for automatically adjusting the height of the seat when the change of seat height is not due to external movement of the vehicle.

Most heavy duty vehicles, such as commercial semis, road construction and farm vehicles require a significant suspension system for the vehicle seat that meets the dual requirements of driver safety and comfort. These requirements are met by a suspension system that is adjustable, that isolates the driver from shocks and vibrations induced by the terrain or road, and that can provide automatic-leveling ride heights. In many vehicles, the suspension system is centered on a hydraulic or pneumatic system in which fluid pressure is adjusted to control the height and motion of the vehicle seat. These systems range from a single-cylinder scissors-linkage system, such as shown and described in European Patent Application No. 0 073 096, published on Mar. 2, 1983, the entire disclosure of which is incorporated herein by reference, to a more complex multi-cylinder system, such as the system disclosed in U.S. Pat. No. 6,059,253, issued on May 9, 2000, the entire disclosure of which is incorporated herein by reference.

One problem faced by these prior suspension systems is that the active control of the seat height does not differentiate from height changes induced by external movement of the vehicle. Thus, the shock and vibration displacements induced by traveling over rough terrain, for instance, leads to continuous, and unnecessary, height adjustments of the vehicle seat. Another problem with suspension systems is even one with automatic height adjust such as the one disclosed in U.S. Pat. No. 7,575,206, does not allow for an operator to individually set their preferred seat height versus a weight based preset preferred height from the factory. Furthermore, the system in U.S. Pat. No. 7,575,206 results in a readjustment of the seat height whenever the seat is left unoccupied for more than seven seconds, which can result in increased wear and tear. Thus, there is a need for an active automatic seat height adjustment system that avoids the problems of the prior art systems.

SUMMARY

The present disclosure is directed to an automatic seat height system that adjusts a seat height in comparison to a desired seat height only when the position of the seat is not due to external forces such as vibration or shock. The seat height apparatus comprises a sensor, a height adjustment apparatus, a controller and a controllable actuator all in operable communication.

A method for running the system is also contemplated. The controller comprises software that calculates a calculated seat height based on raw seat heights. The calculated seat height is a time history position value pattern. The controller then compares a calculated seat height to a desired seat height to determine a change factor. If the change factor is outside of a predetermined range, the controller directs the controllable actuator to change the height of the seat to bring it within the range.

In one embodiment, the height adjustment apparatus allows an operator to set a desired seat height. An operator presence apparatus may also be included wherein the absence of an operator, the system is turned off.

Other aspects will become apparent by consideration of the detailed description and accompanying drawings.

DETAILED DESCRIPTION

Figure 1:
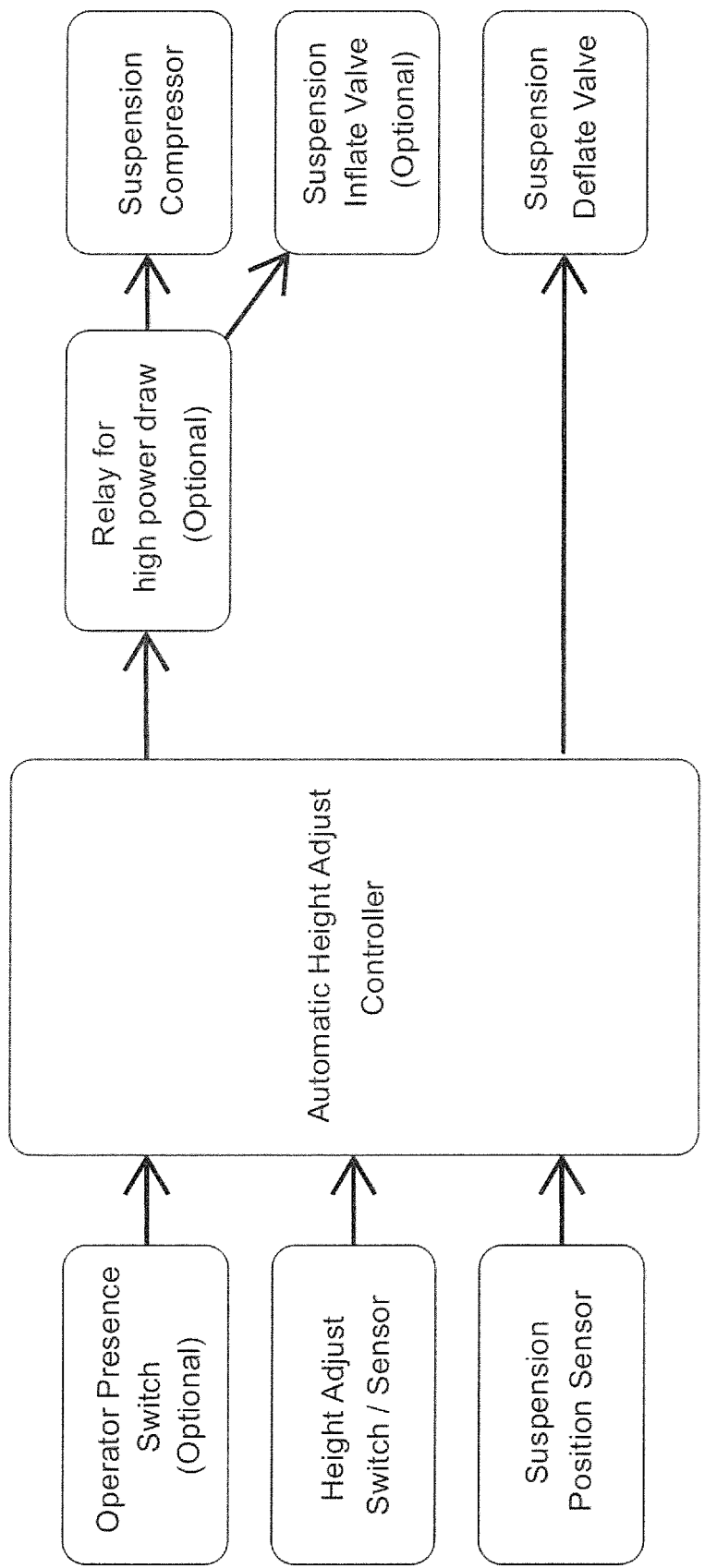
FIG. 1 is a block diagram of components of the seat height adjustment system disclosed herein.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains As is understood, in many embodiments herein seat and suspension height are used interchangeably. In other embodiments, such as where the seat may not be hard constrained to the upper suspension housing, suspension height is measured. This disclosure can be adapted to many different types of seat suspensions. For example, use of the system with the suspensions in U.S. Pat. Nos. 9,527,416 and 9,527,416, both of which are incorporated by reference, is contemplated.

A seat height adjustment system according to the present disclosure can be implemented through a suspension actuator 10, shown diagrammatically in FIG. 1, which in the case of the embodiment shown in FIG. 1 is a compressor used to provide pressurized fluid or gas to a hydraulic or pneumatic cylinder or cylinders in the seat suspension system. It is understood that the cylinder(s) can be actuated to adjust, or raise, the height of the vehicle seat, as described and disclosed in the patent publications discussed above. The system further includes a suspension deflate device 12, such as the valve of FIG. 1, that can be actuated, or opened, to release pressure from the cylinder(s) to adjust, or lower, the height of the seat. In this embodiment, the compressor and valve thus cooperate to regulate the pressure within the cylinder(s) and thereby the height of the vehicle seat, by way of the seat suspension.

It is understood that the seat suspension system may utilize electrical solenoids or similar electrical devices, rather than the hydraulic/pneumatic components, to adjust the height of the seat. In this instance, the suspension actuator 10 is an appropriate electrical controller that supplies an energizing current to a solenoid. The suspension deflate device 12 can be a solenoid and an electrical switch that terminates the energizing current to the solenoid. Other electrical or mechanical devices are contemplated to adjust the height of the vehicle seat through the seat suspension.

In one aspect of the height adjustment system, one or more sensors provide information about the seat and suspension. A suspension position sensor 14 provides raw information regarding the position of the vehicle seat. In one embodiment, the position sensor measures displacement or angle of rotation of the suspension arm as compared to the suspension lower housing. These values can be measured by a change in resistance or a change in magnetic field or by digital pulses or sonar. The skilled artisan understands that the type of measurement method or value of the measurement is not limiting as long as the measurement provides information relating to the actual position of the seat. For example, in the embodiment above, a potentiometer based on a sensor measures the angle of rotation of the suspension arm as compared to the suspension lower housing. The sensor outputs a ratiometric voltage based on the supply voltage and sensor position. But other sensor outputs such as applicable current or digital outputs such as pulse width modulation (PWM), Inter-Integrated Circuit (I2C), Serial Peripheral Interface (SPI), controller area network (CAN), and Local Interconnect Network (LIN) are contemplated. As is understood by the skilled artisan, the suspension position sensor 14 can be of a variety of types of sensors and can be integrated into the seat suspension in a variety of ways as is known in the art. The only limiting factor is that the suspension position sensor be able to sense the position of the seat. For instance, the sensor can be an encoder, proximity sensor or potentiometer, and determine seat height by sensing a position of a component of the suspension, such as a particular link of a scissors linkage mechanism or rotation of the suspension arm as disclosed above. Software or firmware within a processor, such as a processor within a height adjustment controller 20, is configured to receive a signal from the sensor 14, whether a current or a voltage signal, and determine a height of the seat from that signal, or at least determine a value indicative of a height of the seat. Controller 20 then calculates and converts this raw signal into an engineering value. To determine seat height, the raw signal may be voltage corresponding to distance, such as millimeters, or a percentage of travel. Controller 20 is calibrated using the position of sensor 14 versus displacement of the seat height and the minimum and maximum of the sensor raw values. In some embodiments, predetermined minimum/maximum values are included in controller 20 software to reduce the need for calibration. However, predetermined values do not allow for variability between production parts. It is contemplated that one or more sensors 14 may provide the sensor data to provide an indication of the seat height. In one embodiment, a single sensor is used. A single potentiometer sensor may be advantageous in that it gives immediate precise feedback. In another embodiment, an accelerometer sensor may be used. However, in the embodiments where an accelerometer is used, because accelerometer data must be further converted for accurate position data, the data using an accelerometer may be off shifted from real time data. In yet another embodiment, several sensors can be used. Use of more than one sensor may be important when dealing with safety critical components and the potential of sensor failure are not acceptable. Examples include steer by wire or fly by wire systems.

In another aspect of the system, a height adjustment apparatus 16, which can be a switch or sensor, is provided. The height adjustment apparatus 16 allows an operator to input a desired seat height. Much like suspension position sensor 14, the height adjustment apparatus 16 can include an encoder, proximity sensor or potentiometer, as well as an array of discrete switches corresponding to desired seat heights. The height adjustment apparatus 16 can be manipulated by the vehicle operator to position the seat at a desired height. It is further contemplated that the height adjustment apparatus 16 can be manipulated in other ways, such as by input to an electronic controller which adjusts the seat height accordingly. A sensor based switch can be used, such as a potentiometer, to provide a range of voltage values to controller 20 to determine a desired height value. In another embodiment, a momentary on/off switch based on operator input sends digital or analog signals to controller 20 to indicate to raise or lower the seat. In this embodiment, controller 20 calculates a seat height based off of a running average time history of the raw or converted suspension position. For example, the running average time history is determined by observing the seat within a predefined maximum period of time of five seconds. This history is compared by controller 20 to the desired seat height input by the operator or predefined in the system. In some embodiments, desired seat height data will also be a running time average history (calculated value). In other embodiments, it will be a constant value. Generally if a constant value is used for desired seat height data, the data will be converted into the same units as calculated seat height.

If height adjustment apparatus 16 is a momentary switch, by continually activating the momentary switch, an operator can infinitely adjust the seat height within the suspension range. Whereas in this or another embodiment, a simple engagement of the momentary switch indicates to controller 20 to adjust suspension height by a predetermined amount. For example, the predetermined amount could be 10 mm or 10% of travel although different predetermined amounts are envisioned and well known in the art.

In one example, height adjustment apparatus 16 further includes controls through a touch screen. In this example, an operator can set a desired height through a human machine interface (HMI), and the resulting signal is sent to controller 20 to direct suspension actuator 10 or suspension deflate device 12 to adjust the seat to the desired position. In yet another example, height adjustment apparatus 16 consists of both a switch/sensor and a touch screen. In this embodiment, the seat is adjusted based on the most recent signal received, whether from a switch/sensor or a human machine interface. The human machine interface may receive the desired height value if the most recent signal is from a switch/sensor so that the desired seat height can be displayed to the operator.

The system may optionally include an operator presence sense apparatus 18 that is integrated into the seat or suspension. This can be a switch or a sensor. In one embodiment, if it is a switch, the switch in effect detects the weight of the operator in the seat, which is obviously indicative of the operator presence. The operator presence sense apparatus 18 can take a variety of forms capable of generating a signal for use by the controller 20, wherein the signal indicates the presence of an operator in the seat. In some embodiments, where an operator presence sense apparatus 18 is not present or is not functioning, the automatic height adjust is turned off when the seat goes to the top of its stroke and remains there (and there is no additional input from height adjustment apparatus 16). In this situation, the seat stays at the top of its stroke until the automatic height adjust is again activated through either seat occupation or input from height adjustment apparatus 16. In other embodiments, the seat lowers when the seat is not occupied. However, this may result in more wear on the seat and a negative experience for the operator as the seat height may not be what is currently desired.

The height adjustment system of the present disclosure includes a height adjustment controller 20 configured to calculate a seat height and activate and deactivate the height adjustment components, such as actuator 10 or suspension deflate device 12 in a controlled manner. For example, controller 20 directs the height adjustment of the seat following input receipts of the signals generated by the sensor 14 and apparatus 16 and optional operator presence sense apparatus 18. The input signals to the controller 20 may be voltage or current signals, binary or analog, depending upon the nature of the particular apparatus, i.e. if the apparatus is a switch versus a sensor. In one aspect, the controller 20 is a microprocessor-based controller configured and adapted to execute program instructions as part of software or firmware. In one embodiment, controller 20 directs the steps according to the flowchart shown in FIG. 2.

Figure 2:
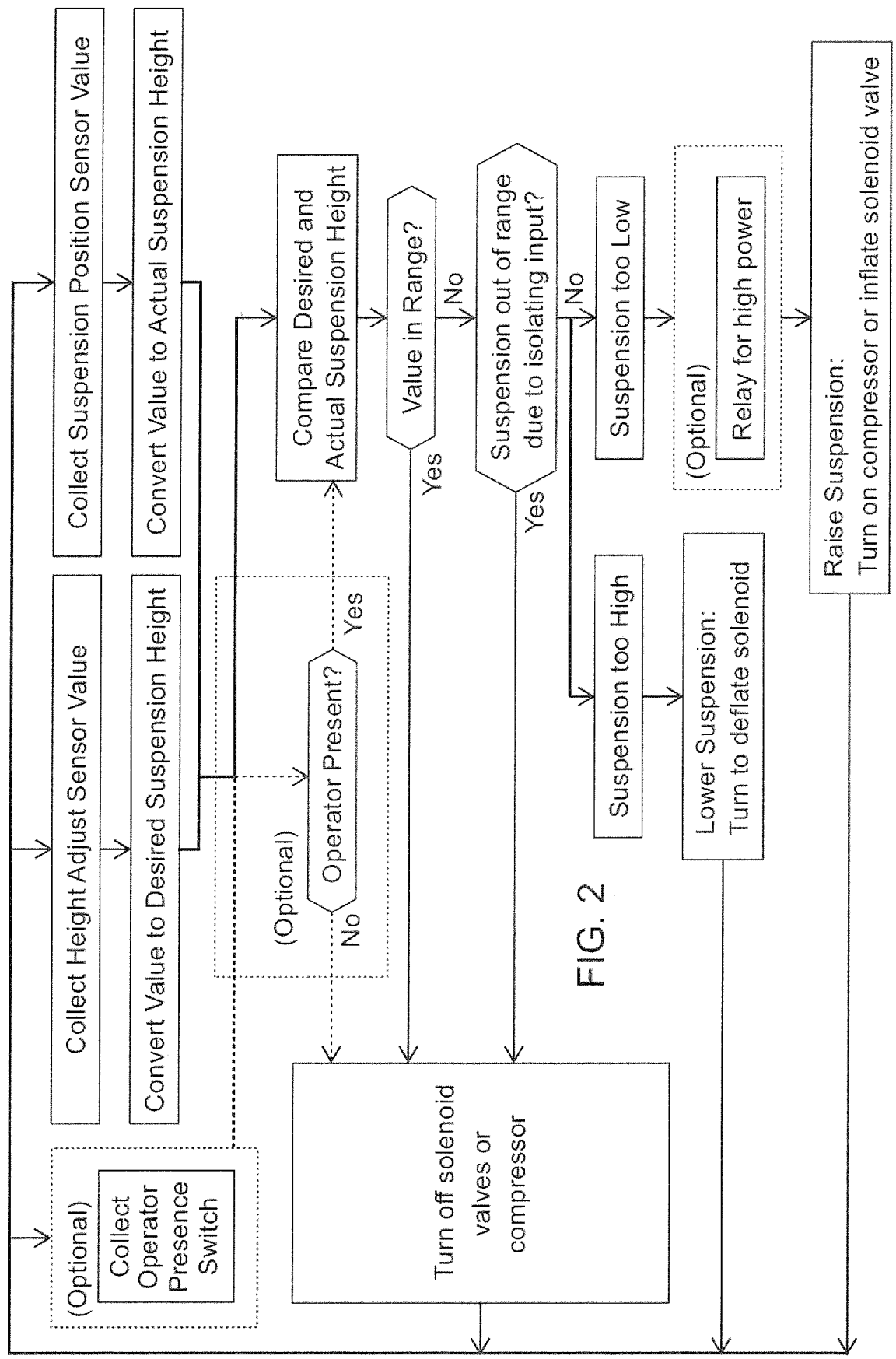
FIG. 2 is a flow chart of a method for seat height adjustment according to the present disclosure as implemented by the height adjustment controller shown in FIG. 1.

As shown in FIG. 2, in a first set of steps, controller 20 receives or collects a value or signal generated by the height adjustment apparatus 16 (Step 30), collects the suspension position sensor 14 signal (Step 32), and optionally collects the information from the operator presence sense apparatus 18 (Step 34). Next (Step 36), value or signal from height adjustment apparatus 16 is converted to a value indicative of a desired seat height, namely the seat height that has been selected by the operator or otherwise preprogrammed. Similarly, signal from the suspension position sensor 14 is converted into a calculated seat height, i.e. time average of the seat height (Step 38). The signal from the desired seat height may also be a calculated desired seat height, i.e. time average of the data from the height adjustment apparatus 16. In other embodiments, the data from seat height apparatus 16 is only a converted value, i.e. a constant value converted from a raw value into the same units as the calculated seat height.

It can be appreciated that in many embodiments, the results of the two conversions and/or calculations, namely the desired suspension height and the calculated seat height, are in comparable units that allow immediate and direct comparison of the two values. In other embodiments, an additional step to convert the values into comparable units are undertaken. It can be appreciated that conversion, such as converting a voltage signal to a digital value, may occur during collection such as that demonstrated by FIG. 2 Steps 30, 32. In this case, the collecting and converting steps can be merged. For example, for a digital controller 20, the values produced in Steps 36, 38, can be a digital value indicative of height, whereas for an analog controller 20, the values produced in Steps 36, 38 can be voltages. One embodiment includes both an analog position sensor that varies voltage and a digital momentary switch for controlling the height of the seat. In another embodiment, the position sensor is digital and the height adjustment is analog. As is understood, analog, digital as well as serial signals are interchangeable. The conversion to common "units" for the comparison demonstrated in Steps 36, 38 depends upon the nature of the value or signal received. Optionally, as shown in FIG. 2, Step 40, the signal from the earlier collected operator presence sense apparatus 18 (Step 34) can be evaluated to determine whether an operator is present in the seat. In certain embodiments where the operator presence is determined by a switch, no conversion of the switch or sensor signal is necessary as the value is either "on" or "off", voltage or no voltage, signal or no signal. In other embodiments, the operator presence sense apparatus has a constant signal to detect if the switch has been bypassed or the switch is no longer connected. For example, in this embodiment, a resistor can be placed between an on/off switch. In addition, a resistor can be placed in series to an on/off switch and provide a known range of values such as to prevent bypassing the on/off switch. In yet another embodiment with an operator presence sense apparatus, additional circuitry and processing of the operator presence sense apparatus 18, such as a capacitance switch is anticipated. In this embodiment, activation or deactivation of operator presence sense apparatus 18 can be through analog, digital, or serial signals. Controller 20 can be configured to detect the presence of any of these signals.

In one example, comparison of the operator presence sense apparatus 18 signal to a predetermined value indicative of the presence of a vehicle operator in the seat, rather than a lighter object on the seat such as a cat or a package. In this instance, controller 20 converts the signal from the operator presence sensor apparatus 18 to a value that can be compared to a threshold value denoting an operator. This threshold value can be stored in a memory of controller 20. Conversely, in the case of an analog controller a reference voltage is used. Regardless of the operator presence sense apparatus 18 signal, controller 20 determines that no operator is present, then there is no need to modify the height of the seat since the operator is unaffected. If no operator is present, the seat height is not adjusted and the suspension actuator 10 is deactivated (Step 58). In some embodiments, this means that no change in pressure within the suspension cylinder(s) is manifested. In the case of an electrical actuator, such as a solenoid, the current to the solenoid can be held in order to maintain the solenoid, and therefore the seat suspension component controlled by that solenoid, at its current position. The applicable solenoid could be either normally open (NO) or normally closed (NC). Depending on the type of solenoid, whether the solenoid is energized or de-energized is interchangeable.

If the optional operator presence sense apparatus 18 is not included in the system, or apparatus 18 indicates that an operator is present in the seat, then controller 20 compares (Step 42) the values for desired seat height (Step 36) and calculated seat height (Step 38) to determine a change factor. The comparison can be direct . . . i.e., are the two values equal . . . or the comparison can be related to a predetermined range, meaning that as long as the two values are within a certain predetermined range the desired and calculated heights are deemed to be equal. As an example, in one embodiment, a desired suspension range can be movement of up to 50 mm with a predetermined limit of ±5 mm from the desired seat height. In another example, the range will be a percentage of seat travel. In yet another example, predetermined values are based on previously measured raw position values. For example, if a raw value from a sensor such as a potentiometer is used then the range could be, for example, a minimum/maximum value of 0.5 v/4 with a range of 2V with a tolerance of ±0.2 v. If the calculated height of the seat is outside of this limit, the seat is automatically adjusted either higher or lower to bring the calculated height to the desired height or within a tolerance of the desired height.

Vibration and shock inputs are ignored based on comparison of the time average of data points (calculated seat height) with the desired suspension range. In some embodiments, this time average of data points is a running average of data based on values collected over 5 seconds although it is understood that this time interval is not limiting and can be increased or decreased depending on the system. In one embodiment, 1000 data points per second are collected. In this embodiment, the data is then recorded for up to five seconds and averaged out. New and old data points are added and removed using a first in, first out method. Use of this number of collected data points per second is also not limiting and can be set for different values, i.e. 500 data points per second. Further, use of a first in first out system is not required. In certain embodiments, input from the height adjustment apparatus 16 is treated in the same manner.

Accelerometer or other sensor values are time averaged either alone or with other sensor signals, such as a potentiometer signal. Thus, in one embodiment, if the comparison of calculated height values and desired height values yields a height difference value, this height difference value is compared to a predetermined range (Step 44). It is understood that this comparison can also be performed in an analog manner using voltage, voltage difference and reference voltage magnitudes.

In embodiments wherein the height difference value falls within the predetermined range, controller 20 does not direct any action (Step 58). In this situation, controller 20 directs the steps demonstrated by the flow chart of FIG. 2 to be recycled. However, if the height difference value falls outside the predetermined range, controller 20 determines (Step 46) whether this out of range condition is due to an input that is the result of vibration or shock. If the out of range condition is due to vibration or shock, the seat is not adjusted. This prevents constantly changing seat height such as when a construction vehicle is driven over rough terrain at a construction site. Seats that are constantly adjusting have increased wear on components, such as the compressor, which can result in early or unexpected failures. In addition, if the seat is constantly adjusted, the noise from the compressor or solenoid valves diminishes operator experience. In the current disclosure, in one embodiment, the seat is set to the individual operator's desired height and results in a consistent ride without large acceleration values to the operator. It does not require the operator to continually adjust the seat as the seat adjusts automatically if the calculated seat height is outside of a desired seat height range. This is particularly useful for operators that may have health issues that restrict their mobility, such as arthritic hands.

In different embodiments, controller 20 is configured to determine whether the height discrepancy is due to sensed vibrations or shocks in a number of ways. In one approach, accelerometers mounted on the vehicle, seat or suspension provide acceleration data to controller 20, where controller 20 determines whether this acceleration data is indicative of a transient input, such as shock or vibration. If the vibration or shock inputs as averaged into a calculated seat height are inside a predetermined threshold, controller 20 does not direct either suspension actuator 10 or suspension deflate device 12 to perform a seat height adjustment. Similarly, the seat height will not be adjusted if controller 20 determines that the input data falls outside the predetermined threshold but controller 20 determines the height discrepancy is due to vibration and shock. This may be the case where the predetermined threshold is based on raw not calculated seat height values. In this situation, controller 20 does not direct height adjustment (Step 58).

The present system determines whether an isolating input is responsible for the difference between calculated seat height and a desired seat height by evaluating the suspension position values generated by sensor 14 and comparing them to the desired seat height. In particular, in one embodiment, controller 20 evaluates several successive suspension position sensor 14 values and determines a pattern in the change of those values and recognizes whether the particular pattern is indicative of a shock or vibration. The system continually monitors the sensors to determine if any change has occurred which would necessitate further treatment (Steps 42-56).

Figure 3:
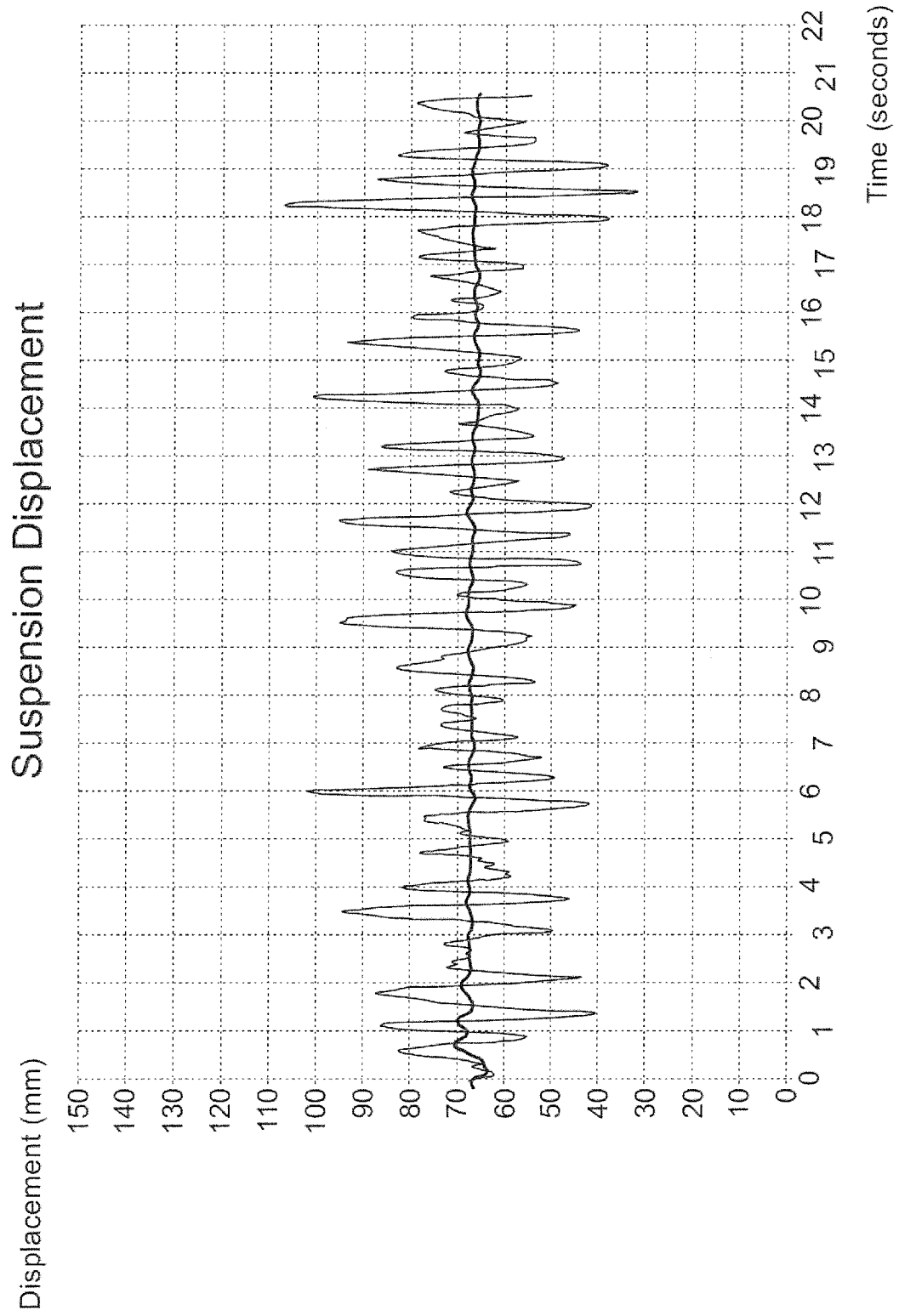
FIG. 3 is a graph of the sinusoidal inputs of vibration measured against the time history position average value to give a calculated height.

In one embodiment, such as shown in FIG. 3, the pattern is a normalized actual height based on the time history position of the sinusoidal inputs of vibration. However, rate of change of position, velocity, acceleration and vibration isolation patterns are also anticipated. For instance, velocity of 100 mm/sec or vibration frequencies over 2 hz, can be indicative of an random terrain vibrations like gravel and velocities of 250 mm/sec can be indicative of shock loads such as potholes and ruts. Single or multiple events causing vibration, such as rocks, pot holes, ruts, crop rows and random vibration are averaged out in the time history and only have a minimal overall effect, thus keeping the seat height within the set predetermined threshold. In this situation, the height of the seat is not adjusted. However, as the time history average changes outside of the predetermined threshold, such as slowly dropping due to an air leak for example, the system adjusts the seat back into the predetermined threshold/tolerance. This adjustment back does not require that the seat height be adjusted exactly back to the desired seat height. In some embodiments, the seat height will be adjusted but still be one or more degrees away from the desired seat height. This broader acceptable adjustment keeps the system from continually running. In other embodiments, the seat height will be adjusted back to within a degree of the preferred seat height. The looseness of the correction can also depend on the type of suspension actuator 10. In systems with a compressor, the adjustment of the seat height is generally slower than in systems using a solenoid. In the case of a slower adjusting system, it may be more advantageous to adjust the seat closer to the desired seat height. With a solenoid, the adjustment is usually faster and there is generally a small amount of movement after actuation so the system may adjust the seat further away from the desired seat height but still within the acceptable range.

Controller 20 evaluates several suspension position sensor 14 values (Step 46), in order to determine whether the height change factor is due to an external force. If the height change factor is outside the range but due to external factors, the controller does not direct seat height adjustment (Step 58). In contrast, if the controller determines the height change factor is outside the range and due to internal factors, controller 20 determines whether the suspension is too high (Step 48), or too low (Step 50) by comparing the calculated seat height with the desired seat height. Controller 20 can be configured such that the values determined, such as those shown in FIG. 2 Steps 42, 44, 48 and 50, provide not only an indication as to whether the calculated height differs from the operator desired height, but also an indication of whether the seat is above or below the desired height. This can be accomplished by setting a flag (Step 44) if the desired height is greater than the calculated height, and setting a different flag if the desired height is lower than the calculated height. For example, the predetermined flags are ± predetermined ranges or tolerances based on the desired seat height. If the running average of the calculated seat height value is greater than the + tolerance, the height change factor is outside the range and controller 20 directs the seat height to be lowered. In one embodiment, controller 20 is programmed with a third flag to indicate that the height range factor is within a predetermined range and requires no adjustment. Controller 20 evaluates the flags (Step 48, 50) to determine the direction of the height change factor and how the seat height should be adjusted.

If it is determined that the seat is too high (Step 58), controller 20 directs the suspension to be lowered an amount such that the adjusted height falls into a range of the desired seat height. In many embodiments, the adjustment will be a fixed amount. For example, a predetermined timed release of air pressure is performed gradually until the calculated seat height falls in range of the desired seat height. Or lowering air pressure to lower the seat height is used. (Step 52). In the case of a hydraulic/pneumatic height adjustment mechanism, controller 20 activates suspension deflate apparatus 12 to release pressure. Alternatively, if the adjustment mechanism is electrical, such as a solenoid, in one embodiment, controller 20 directs the current to the solenoid to be either turned on or turned off to retract the solenoid plunger appropriately. In another embodiment, the current to the solenoid is simply reduced or increased. Depending on the type of solenoid, such as one that is normally open or normally closed, controller 20 turns on or turns off the solenoid such that air is directed toward the suspension or vented into the atmosphere. In one example, a 3 port 2 position solenoid valve is used. In other embodiments, the solenoid is a 2 port 2 position solenoid valve or a 3 port 3 position solenoid valve. The type of solenoid used will generally depend on the type of vehicle or seat use. A solenoid provides for the need for less energy and increased safety by retaining air pressure in the air spring even in the event of a loss of power.

The fixed amount that the seat height is adjusted can be a predetermined distance or can be based on the height change factor determined in Step 42. Using a predetermined distance allows for gradual adjustment of the seat height which can be more comfortable to the operator and can account for variations during the height adjustment process. This is because if the seat is too high by 100 mm or more, then a sudden drop or increase to the desired height might startle the operator. A gradual change brings the system in range without a need for notice to the operator.

If controller 20 determines that the seat height is too low (Step 50), meaning the calculated seat height is below the operator desired position and outside of the range, then controller 20 directs that the suspension be raised (Step 56) through actuator 10. In one embodiment, the seat height is raised by controller 20 activating actuator 10 to increase pressure in cylinder(s) to raise the suspension and therefore the seat. Of course, other suspension mechanisms will require different forms of actuation, such as an electrical solenoid.

In an optional embodiment, direction from controller 20 to actuator 10 or suspension deflate device 12 passes through a relay 22 (FIG. 1) (Step 50). An optional relay can be used with either or both a compressor or a solenoid, although in many embodiments, the relay will only be used with a compressor. In this situation, controller 20 is designed to have a minimum amount of current supply available instead of the normally high requirements of a compressor. Passage through relay 22 increases power input to the compressor.

As with the action of lowering the suspension as demonstrated in Step 52, raising the seat height as demonstrated in Step 56 can occur incrementally by a predetermined amount. Alternatively, the suspension can be raised by the entire difference between the actual and desired seat heights. Once the seat height has been adjusted by direction of controller 20 to suspension actuator 10 or suspension deflate device 12 (Step 56), controller 20 once again starts collecting raw seat height values (Steps 30, 32).

It can be appreciated that raising and lowering of the seat height in the present disclosure excludes height changes due to external forces, such as vibration and shock. Nevertheless, in certain uncommon situations, the disclosed embodiments can account for changes in seat height due to external forces, such as where the calculated height of the seat falls outside the desired seat height range. If this adjustment is not what the operator wants, the range of acceptable values can be increased. Furthermore, an operator can deliberately adjust the seat height based on terrain using height adjustment apparatus 16.

In one embodiment, the suspension system includes hydraulic or pneumatic cylinders that adjust the position of the suspension components, and therefore the height of the suspension and the seat supported by the suspension. A suspension actuator 10, such as a suspension compressor, or suspension deflate device 12, changes pressure in a suspension cylinder(s) to adjust suspension height. However, a solenoid or control valve connected through a momentary normally closed manual value can be actuated in lieu of a compressor. Although an electrical solenoid is offered as one example of an electrical suspension system, other types of electrical devices are contemplated, such as a stepper motor, a gear motor and the like. As further discussed above, other suspension system mechanisms are contemplated provided they have the ability to selectively adjust based on isolated inputs of the seat height. The only limitation is that regardless of the mechanism, the system must have the ability to selectively adjust the seat height.

The height adjustment controller 20 can communicate with the various components of the system directly or indirectly. For direct communication, the components, such as the sensors 14, apparatus 16, apparatus 18, suspension actuator 10 and suspension deflate device 12 can be connected directly to the controller by appropriate wiring. Communication with controller 20 can be based on analog or digital signals and can follow a variety of communications protocols, such as LIN, CAN, UART, SPI and the like. Alternatively, the communication between controller 20 and certain components can be wireless using a variety of known wireless communication protocols.

In one embodiment, when the vehicle is on, controller 20 is configured to continuously run through the steps demonstrated by the flowchart loop of FIG. 2. In certain scenarios, an operator must only turn the key to power on the seat. In other examples, the vehicle provides power to the seat without an operator present, such as through the use of remote start. In some situations, pre-adjustment prior to the operator occupying the seat is desired.

Figure 4:
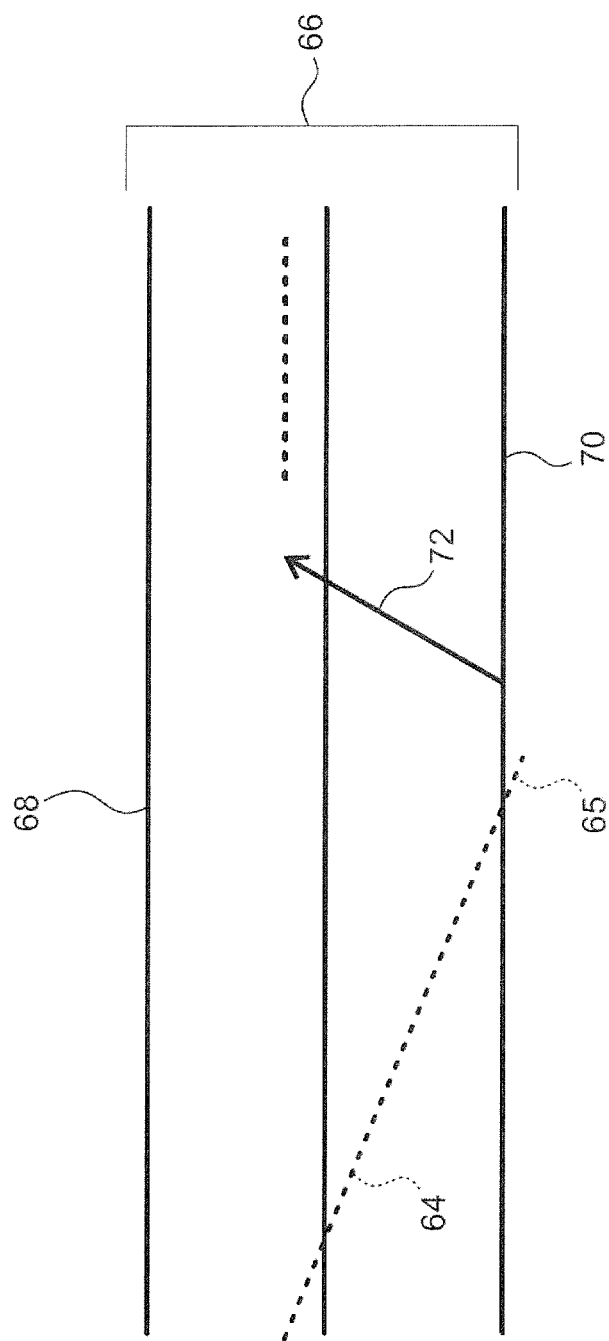
FIG. 4 is a schematic diagraph of an automatic seat height adjustment following determination that the value of calculated seat height is outside a predetermined threshold.

FIG. 4 shows via a schematic diagram, the change in height of a vehicle seat. Set level 60 is the desired seat height. The time average vibration profile 64 is initially within set range 66 and upper 68 and lower 70 limits. Internal forces, such as differences in operator weight or leaky valves, change the time averaged calculated seat height. When internal data is sent to controller 20, the time average vibration profile 65 can shift outside of set range 66. If the shifted state is outside the predetermined range the seat height is adjusted 72 to once again bring the seat height within the acceptable range.

The height adjustment system of the present disclosure thus provides an automatic and interactive system for adjusting seat height to maximize operator safety and comfort under many driving conditions. The present height adjustment mechanism is also "smart" in part because it distinguishes over seat height changes due to terrain from height changes due to internal factors such as operator weight or leaky suspension components.

The present disclosure should be considered as illustrative and not restrictive in character. It is understood that only certain embodiments have been presented and that all changes, modifications and further applications that come within the spirit of the disclosure are desired to be protected.

The invention claimed is:

1. A system for adjusting the height of a suspension seat, comprising at least one detector, at least one operator input device, at least one controller, and at least one controllable device, all constructed and configured in network communication;
   wherein the at least one detector measures a raw seat height;
   wherein the at least one operator input device measures a desired seat height;
   wherein the at least one controller converts the raw seat height into a calculated seat height; and
   wherein the at least one controllable device is operable to control the adjustment of the height of the seat in response to a signal from the controller wherein the calculated seat height is a normalized value of sinusoidal inputs of vibration measured against a time history position average value.

2. The system of claim 1 wherein the controller sends a signal to the at least one controllable device when a change factor between the calculated seat height and the desired seat height falls outside of a predetermined range.

3. The system of claim 2 wherein the controllable device is operable to adjust a seat suspension height based on the change factor.

4. The system of claim 1 further comprising two detectors, wherein one detector measures a raw height of a seat and a second detector measures a presence or an absence of an operator.

5. The system of claim 4 wherein the controllable device is not activated if a signal from the second detector measures an absence of an operator.

6. A method for adjusting the height of a seat comprising the steps of:
   recording a raw height of a seat;
   recording a desired height of a seat;
   calculating a calculated seat height;
   comparing the calculated seat height to the desired height to determine a height change factor;
   activating an actuator when the change factor is above a predetermined range, wherein the actuator moves the seat either up or down.

7. A device for adjusting the height of a seat comprising;
   a. a first detector determining a raw height of a seat;
   b. a second detector determining a value for a desired height of the seat;
   c. a controller connected to the first and second detector, wherein the controller is configured for receiving, storing and processing information from the first detector and the second detector; and wherein the controller
      i. calculates a calculated seat height;
      ii. compares the calculated height to the desired height of the seat to determine a change factor;
      iii. calculates whether the change factor falls within a predetermined range; and
      iv. automatically activates a controllable device when the change factor falls outside a predetermined range.

8. The device of claim 7 wherein the predetermined range comprises 10 mm or 10% of the desired seat height.

* * * * *